(12) United States Patent
MacDonald et al.

(10) Patent No.: US 8,096,885 B2
(45) Date of Patent: Jan. 17, 2012

(54) METHOD AND APPARATUS FOR LASH PREVENTION USING COIL SPRINGS

(75) Inventors: Fraser MacDonald, Farmington Hills, MI (US); Jens Schroeter, Karlsbad (DE); Steven Olsen, Wooster, OH (US); Craig Kneidel, Massillon, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 431 days.

(21) Appl. No.: 12/220,423

(22) Filed: Jul. 24, 2008

(65) Prior Publication Data

US 2009/0032364 A1    Feb. 5, 2009

Related U.S. Application Data

(60) Provisional application No. 60/961,897, filed on Jul. 25, 2007.

(51) Int. Cl.
*F16F 15/121* (2006.01)
(52) U.S. Cl. ...... 464/68.6; 464/68.1; 29/446; 403/359.4
(58) Field of Classification Search .............. 464/66.1, 464/68.1, 68.6; 403/359.2, 359.4; 192/3.29, 192/212; 29/446, 888; 700/280
See application file for complete search history.

(56) References Cited

U.S. PATENT DOCUMENTS

| 1,240,126 | A | * | 9/1917 | Dubois ............... 464/66.1 X |
| 3,486,597 | A |   | 12/1969 | Carlton |
| 3,788,099 | A |   | 1/1974 | Miller |
| 4,461,376 | A | * | 7/1984 | Lech et al. |
| 4,588,062 | A |   | 5/1986 | Caray et al. |
| 4,785,924 | A |   | 11/1988 | Jackel et al. |
| 6,213,882 | B1 |  | 4/2001 | Okada et al. |
| 6,585,091 | B2 |  | 7/2003 | Reinhart et al. |
| 7,980,369 | B2 |  | 7/2011 | Kneidel et al. |
| 2007/0048082 | A1 | | 3/2007 | Hoffmann et al. |

* cited by examiner

*Primary Examiner* — Gregory Binda
(74) *Attorney, Agent, or Firm* — Simpson & Simpson, PLLC

(57) ABSTRACT

A vibration damper including a first spline having a plurality of first teeth, a second spline having a plurality of second teeth, a third spline having a plurality of third teeth and at least one spring interconnected between the first and second splines, wherein the plurality of third teeth are intermediate the plurality of first teeth and the plurality of second teeth, and the at least one spring biases the plurality of first teeth and the plurality of second teeth against the plurality of third teeth. A method of preventing lash in a vibration damper, the vibration damper including a first spline having a plurality of first teeth, a second spline having a plurality of second teeth, a third spline having a plurality of third teeth and at least one spring interconnected between the first and second splines, the method including the steps of: introducing the plurality of third teeth intermediate the plurality of first teeth and the plurality of second teeth; and, biasing the plurality of first teeth and the plurality of second teeth against the plurality of third teeth with the at least one spring.

14 Claims, 14 Drawing Sheets

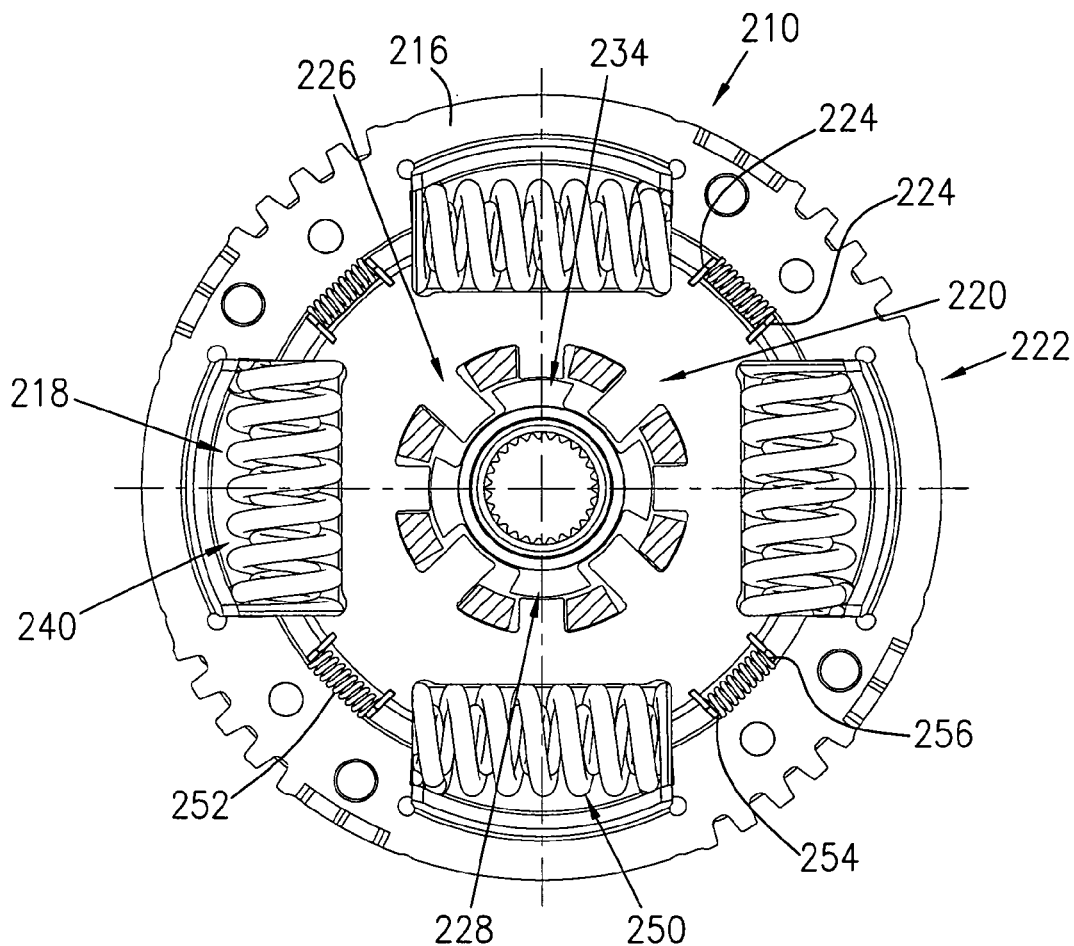
FIG. 15
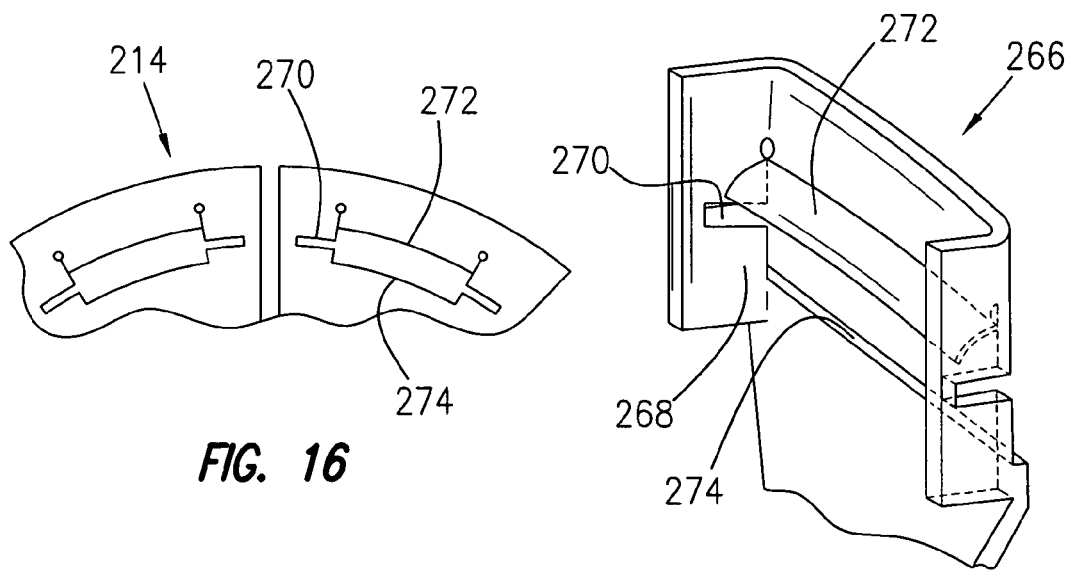
FIG. 16
FIG. 17

METHOD AND APPARATUS FOR LASH PREVENTION USING COIL SPRINGS

CROSS-REFERENCE TO RELATED APPLICATIONS

This application claims the benefit under 35 U.S.C. §119(e) of U.S. Provisional Application No. 60/961,897 filed on Jul. 25, 2007 which application is incorporated herein by reference.

FIELD OF THE INVENTION

The invention broadly relates to vibration dampers, more specifically to preventing lash in vibration dampers, and even more particularly to a vibration damper including a lash prevention plate biased by at least one spring.

BACKGROUND OF THE INVENTION

Hydraulic torque converters, devices used to change the ratio of torque to speed between the input and output shafts of the converter, revolutionized the automotive and marine propulsion industries by providing hydraulic means to transfer energy from an engine to a drive mechanism, e.g., drive shaft or automatic transmission, while smoothing out engine power pulses. A torque converter, arranged between the engine and the transmission, typically includes three primary components: an impeller, sometimes referred to as a pump, directly connected to the converter's cover and thereby the engine's crankshaft; a turbine, similar in structure to the impeller, however the turbine is connected to the input shaft of the transmission; and, a stator, located between the impeller and turbine, which redirects the flow of hydraulic fluid exiting from the turbine thereby providing additional rotational force to the pump.

FIG. 1 illustrates a general block diagram showing the relationship of the engine 7, torque converter 10, transmission 8, and differential/axle assembly 9 in a typical vehicle. FIG. 2 shows a cross-sectional view of a prior art torque converter, shown secured to an engine of a motor vehicle, while FIG. 3 shows a left view of the torque converter shown in FIG. 2, taken generally along line 3-3 in FIG. 2. FIG. 4 shows a cross-sectional view of the torque converter shown in FIGS. 2 and 3, taken generally along line 4-4 in FIG. 3. FIG. 5 shows a first exploded view of the torque converter shown in FIG. 2, as shown from the perspective of one viewing the exploded torque converter from the left, while FIG. 6 shows a second exploded view of the torque converter shown in FIG. 2, as shown from the perspective of one viewing the exploded torque converter from the right. The following discussion is best understood in view of FIGS. 1 through 6.

As described above, the three main components of torque converter 10 are pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10, a fluid circuit is created by the pump, the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

It should be noted that spatial terminology, as used in the specification and the claims herein, is defined as follows. FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Some torque converters include a vibration damper assembly which is constructed separate from the remaining torque converter assembly. For example, FIG. 8 shows a perspective view of prior art vibration damper 100, while FIG. 9 shows a front plan view of vibration damper 100 showing a portion of a turbine hub inserted therein. FIG. 10 shows a cross-sectional view of vibration damper 100 taken generally along Line 10-10 of FIG. 9 showing a turbine hub inserted therein. The following is best understood in view of FIGS. 8 through 10. Vibration damper 100 includes a plurality of damper springs 102 each arranged within an opening 103. As can be seen in the figures, damper springs 102 may be constructed of more than one spring, e.g., outer spring 104 and inner spring 106, thereby providing for different types of damping effects than a single spring configuration. Vibration damper 100 further includes cover plates 108 and 110 and flange plate 112 disposed therebetween. Damper hub 114 comprises outer spline 116 having a plurality of teeth 118 and spaces 120 and inner spline 121. Cover plate 108 includes outer spline 122 having teeth 124 and spaces 126, and inner spline 128 having long teeth 130, short teeth 132 and spaces 134. Hub spline 116 is arranged to rotationally connect to cover plate inner spline 128 so that long teeth 130 are disposed within spaces 120 and short teeth 132 are disposed about outer circumferential surface 133 of teeth 118; however, as can be seen in the figures, spaces 120 are larger than teeth 130 thereby providing for rotational movement of flange plate 112 against damper springs 102, i.e., to provide vibration damping.

It should be appreciated that by rotationally connected, or secured, we mean that hub spline 116 and cover plate inner spline 128 are connected such that the two components rotate together, that is, the two components are fixed or partially fixed, i.e., lash is present, with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. In the discussions infra, a connection is assumed to be a rotational connection unless otherwise specified.

Unlike the above described vibration damper arrangement which is within the torque transmitting path only during clutch lock-up, vibration damper 100 may receive and transmit torque during both clutch lock-up and turbine mode. During clutch lock-up, cover plate 108 is driven by a clutch plate (not shown) via outer spline 122. In this instance, torque is transmitted from a clutch plate to cover plate 108 via outer spline 122, from cover plate 108 to springs 102 via contact between walls 136 and springs 102, from springs 102 to flange plate 112 via contact between springs 102 and walls 138, from flange plate 112 to damper hub 114 via the connection between flange plate 112 and damper hub 114, e.g., weld 140, from damper hub 114 to an input shaft of a transmission (not shown). Contrarily, in turbine mode, torque passes from the turbine, as described above, to turbine hub 142, from turbine hub 142 through teeth 144 of spline 146 to cover plate 108 via long and short teeth 130 and 132, respectively, from cover plate 108 to springs 102 via contact between walls 136 and springs 102, from springs 102 to flange plate 112 via contact between springs 102 and walls 138, from flange plate 112 to damper hub 114 via the connection between flange plate 112 and damper hub 114, e.g., weld 140, from damper hub 114 to an input shaft of a transmission (not shown).

It should be appreciated from the figures that only cross sections of teeth 144 are shown in FIG. 9, while a cross section of the entire turbine hub 142, including teeth 144, is shown in FIG. 10. As can be seen in the figures, spaces 134 may be slightly larger than teeth 144. Thus, during manufacture of a torque converter, turbine hub 142 may be more easily inserted within vibration damper 100. Unfortunately, due to this difference in size, an undesirable rattle is created within the assembly, as turbine rotation speeds up or slows down and clutch lock-up and release occurs. This rattle is due to lash between turbine hub spline 146 and cover plate inner spline 128, i.e., the movement of teeth 144 within spaces 134. Although spaces 134 could merely be decreased in size and thereby reduce lash, assembling a torque converter would become increasingly difficult as it would be more difficult to insert teeth 144 within spaces 134. As one of ordinary skill in the art should understand, increasing assembly difficulty also increases the cost of assembly and thereby the overall cost of a torque converter.

As lash and/or rattle are undesirable, methods and means of reducing such lash are desirable and necessary improvements to vibration dampers. And, as can be derived from the variety of devices and methods directed at reducing such lash, many means have been contemplated to accomplish the desired end, i.e., quiet, smooth, rattle/lash-free operation of a vibration damper. Heretofore, tradeoffs between lash and cost of assembly were required. Thus, there is a long-felt need for a lash-free vibration damper which is easy to assemble.

BRIEF SUMMARY OF THE INVENTION

In accordance with the present invention, a vibration damper structure is provided wherein lash is prevented that overcomes or reduces the disadvantages associated with prior vibration dampers as described in the BACKGROUND OF THE INVENTION above.

The present invention broadly comprises a vibration damper which includes a first spline having a plurality of first teeth, a second spline having a plurality of second teeth, a third spline having a plurality of third teeth and at least one spring interconnected between the first and second splines, wherein the plurality of third teeth are intermediate the plurality of first teeth and the plurality of second teeth, and the at least one spring biases the plurality of first teeth and the plurality of second teeth against the plurality of third teeth. In some embodiments, the vibration damper further includes a cover plate having a first inner circumferential surface having the first spline, a lash plate having a second inner circumferential surface having the second spline, the lash plate arranged co-planar and proximate the cover plate and a turbine hub having a rotational axis and a first outer circumferential surface having the third spline, the rotational axis arranged perpendicular to a plane formed by the cover plate and the lash plate. In other embodiments, the cover plate further includes at least one pair of oppositely disposed cover bearing surfaces and the at least one spring is disposed between the at least one pair of cover bearing surfaces, while in still other embodiments, the cover plate includes at least one cover window and the at least one cover window includes the at least one pair of cover bearing surfaces. In yet other embodiments, the lash plate further includes at least one lash bearing surface and the at least one lash bearing surface is interconnected to one of the cover bearing surfaces by the at least one spring. In still further embodiments, the vibration damper further includes a flange plate having at least one flange window and the cover plate includes at least one cover window in partial alignment with the flange window. In some of these embodiments, the at least one spring is a damper spring, and the at least one cover window and the at least one flange window are arranged to contain the at least one spring, while in others of these embodiments, the at least one spring is a cover spring, and the at least one cover window and the at least one flange window are arranged to contain at least one damper spring, and in still others of these embodiments, the at least one cover window has a first length and the at least one flange window has a second length greater than the first length. In further embodiments, the present invention vibration damper is arranged within a torque converter.

The present invention also broadly comprises a vibration damper including a cover plate having at least one cover window, first inner and outer circumferential surfaces, the at least one cover window includes at least one cover bearing surface, and the first inner circumferential surface includes a first spline. This embodiment of the vibration damper also includes a damper hub having second inner and outer circumferential surfaces, at least a portion of the second outer circumferential surface includes a second spline rotationally connected with the first spline, and the second inner circumferential surface includes a third spline. The vibration damper further includes a flange plate having at least one flange window and a third inner circumferential surface, the third inner circumferential surface fixedly secured to the second outer circumferential surface, and the at least one flange window in partial alignment with the at least one cover window, and a turbine hub having a third outer circumferential surface, the third outer circumferential surface including a fourth spline, the fourth spline rotationally connected with the first spline. This embodiment of the vibration damper also includes at least one damper spring having first and second ends, and disposed within the at least one cover window and the at least one flange window, and also includes a lash plate having fourth inner and outer circumferential surfaces, the fourth inner circumferential surface includes a fifth spline, the fourth outer circumferential surface includes at least one engagement arm, the at least one engagement arm contacting the first end of the at least one damper spring and the at least one cover bearing surface contacting the second end of the at least one damper spring, wherein the at least one damper spring biases the first and fifth splines against the fourth spline. In further embodiments, the present invention vibration damper herein described is arranged within a torque converter.

The present invention further broadly comprises a vibration damper including a cover plate having at least one cover window, first inner and outer circumferential surfaces and at least one pair of oppositely disposed cover bearing flanges, and the first inner circumferential surface include a first spline. This embodiment of the present invention also includes a damper hub having second inner and outer circumferential surfaces, at least a portion of the second outer circumferential surface includes a second spline rotationally connected with the first spline and the second inner circumferential surface comprises a third spline. The vibration damper further includes a flange plate having at least one flange window and a third inner circumferential surface, the third inner circumferential surface is fixedly secured to the second outer circumferential surface, the at least one flange window in partial alignment with the at least one cover window, and also includes a turbine hub having a third outer circumferential surface, the third outer circumferential surface including a fourth spline, and the fourth spline is rotationally connected with the first spline. This embodiment of the present invention further includes at least one damper spring disposed within the at least one cover window and the at least one flange window and at least one cover spring having first and second ends and disposed between the at least one pair of cover bearing flanges. The vibration damper yet further includes a lash plate having fourth inner and outer circumferential surfaces, the fourth inner circumferential surface includes a fifth spline, the fourth outer circumferential surface includes at least one engagement arm, the at least one engagement arm is contacting the first end of the at least one cover spring and one of the at least one pair of cover bearing flanges is contacting the second end of the at least one cover spring, wherein the at least one cover spring biases the first and fifth splines against the fourth spline. In further embodiments, the present invention vibration damper herein described is arranged within a torque converter.

The present invention still further broadly comprises a method of preventing lash in a vibration damper, the vibration damper includes a first spline having a plurality of first teeth, a second spline having a plurality of second teeth, a third spline having a plurality of third teeth and at least one spring interconnected between the first and second splines, the method including the steps of: introducing the plurality of third teeth intermediate the plurality of first teeth and the plurality of second teeth; and, biasing the plurality of first teeth and the plurality of second teeth against the plurality of third teeth with the at least one spring. In some embodiments, the vibration damper further includes a first cover plate having a first inner circumferential surface including the first spline, a lash plate having a second inner circumferential surface including the second spline, the lash plate arranged co-planar and proximate the first cover plate and a turbine hub having a rotational axis and a first outer circumferential surface including the third spline, the rotational axis arranged perpendicular to a plane formed by the first cover plate and the lash plate.

It is a general object of the present invention to provide a means and method for preventing lash and rattle between a vibration damper and a rotationally connected hub.

It is another general object of the present invention to prevent lash within a spline connection, without significantly increasing assembly cost, time or complexity.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 15 is a front plan view of another embodiment of a present invention vibration damper showing a portion of a turbine hub inserted therein;

FIG. 16 is a front plan view of a second embodiment of a present invention lash plate prior to forming;

FIG. 17 is a perspective view of a portion of the lash plate of FIG. 16 after forming;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "spline," as appearing in the specification and claims, is intended to mean a series of projections on a shaft that fit into slots on a corresponding shaft, enabling both to rotate together, the groove or slot for such a projection and also a series of projections extending parallel to the axis of a shaft and arranged about the axis, e.g., spline 146. Although any methods, devices or materials similar or equivalent to those described herein can be used in the practice or testing of the invention, the preferred methods, devices, and materials are now described.

The invention is a vibration damper having a lash plate arranged to prevent lash and/or rattle that overcomes or reduces the disadvantages associated with prior vibration dampers as described in the BACKGROUND OF THE INVENTION above. In particular, the vibration damper of the invention uses two biased splines to engage a third spline, thereby preventing lash within the assembly.

Figure 1:
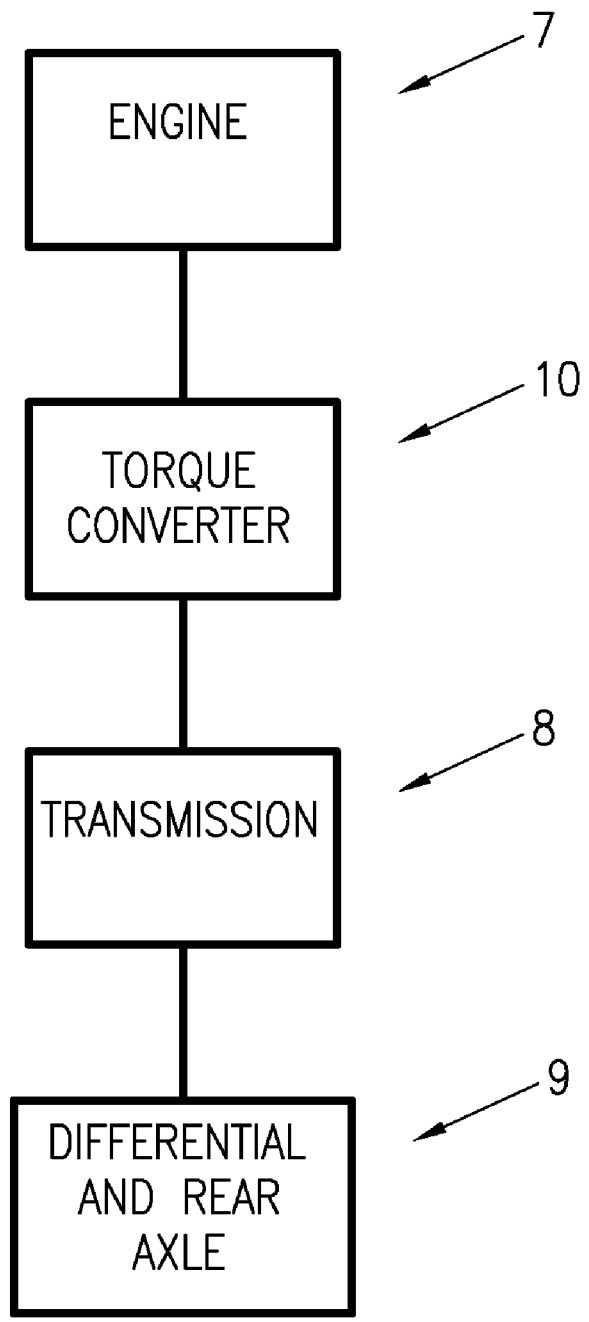
FIG. 1 is a general block diagram illustration of power flow in a motor vehicle, intended to help explain the relationship and function of a torque converter in the drive train thereof.
Figure 2:
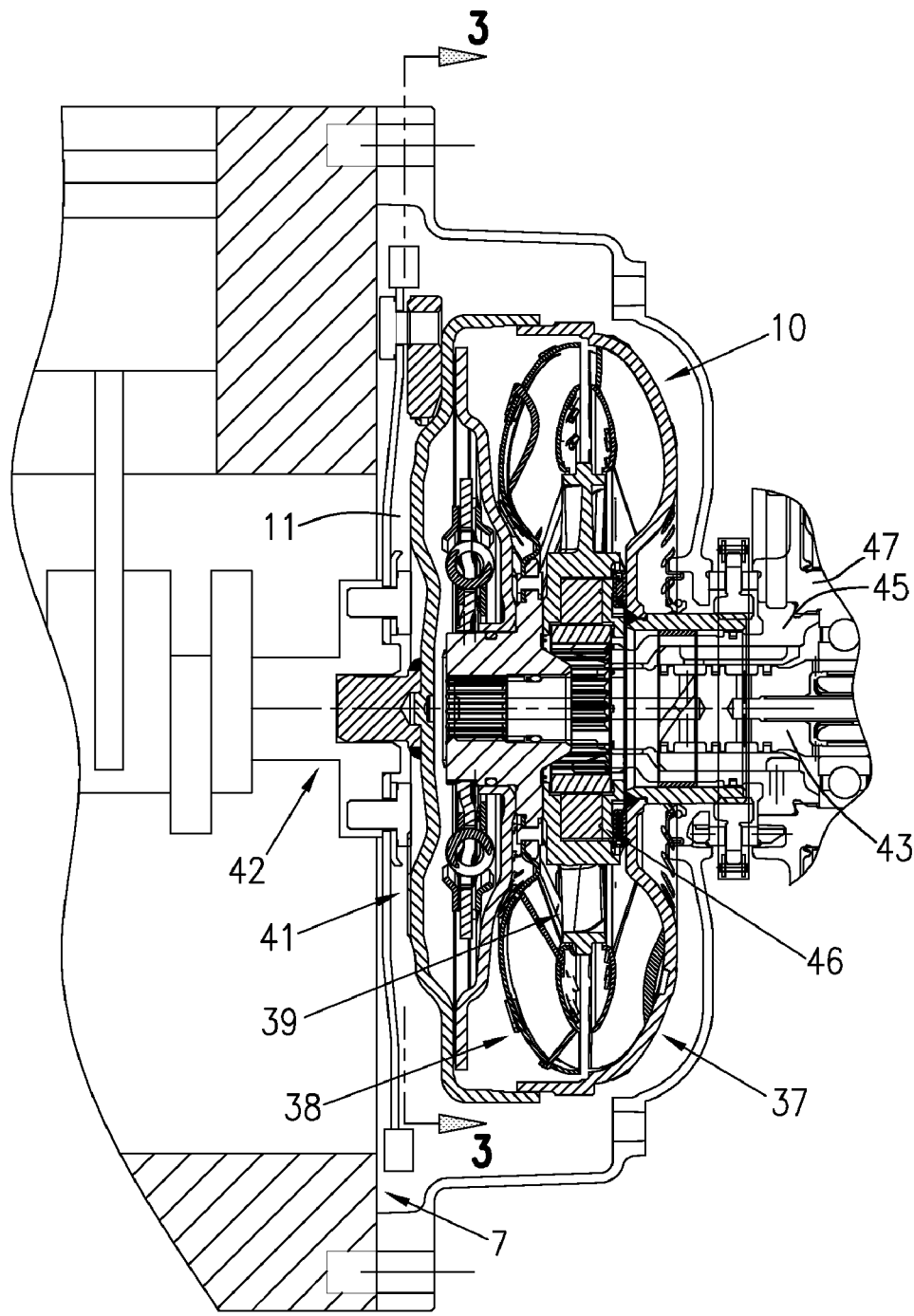
FIG. 2 is a cross-sectional view of a prior art torque converter, shown secured to an engine of a motor vehicle.
Figure 3:
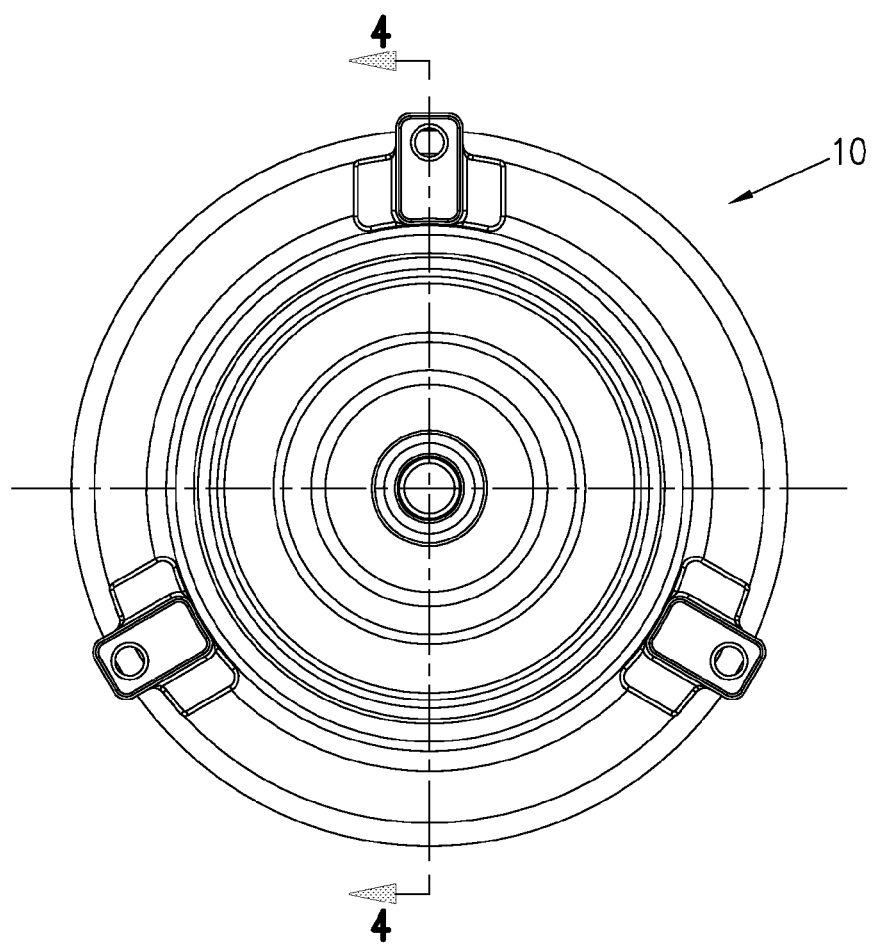
FIG. 3 is a left view of the torque converter shown in FIG. 2, taken generally along line 3-3 in FIG. 2.
Figure 4:
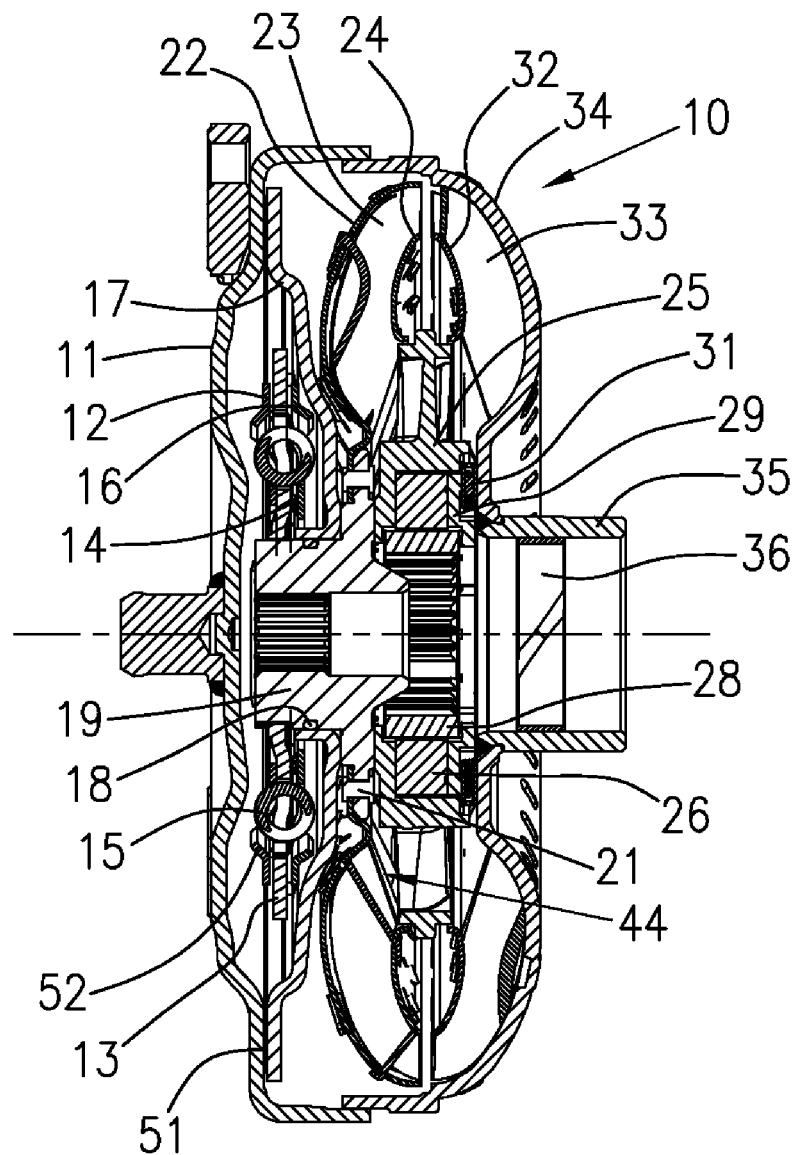
FIG. 4 is a cross-sectional view of the torque converter shown in FIGS. 2 and 3, taken generally along line 4-4 in FIG. 3.
Figure 5:
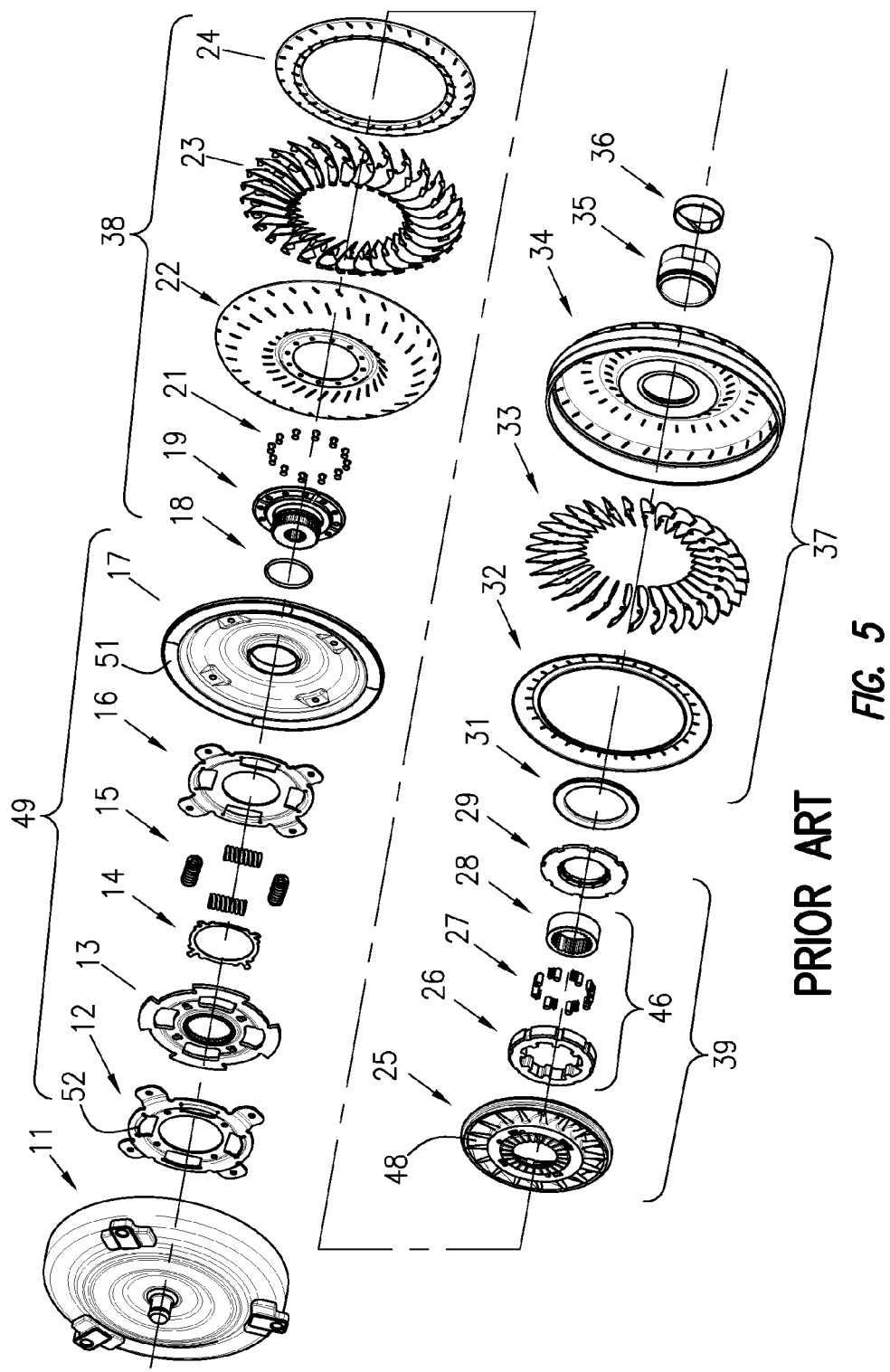
FIG. 5 is a first exploded view of the torque converter shown in FIG. 2, as shown from the perspective of one viewing the exploded torque converter from the left.
Figure 6:
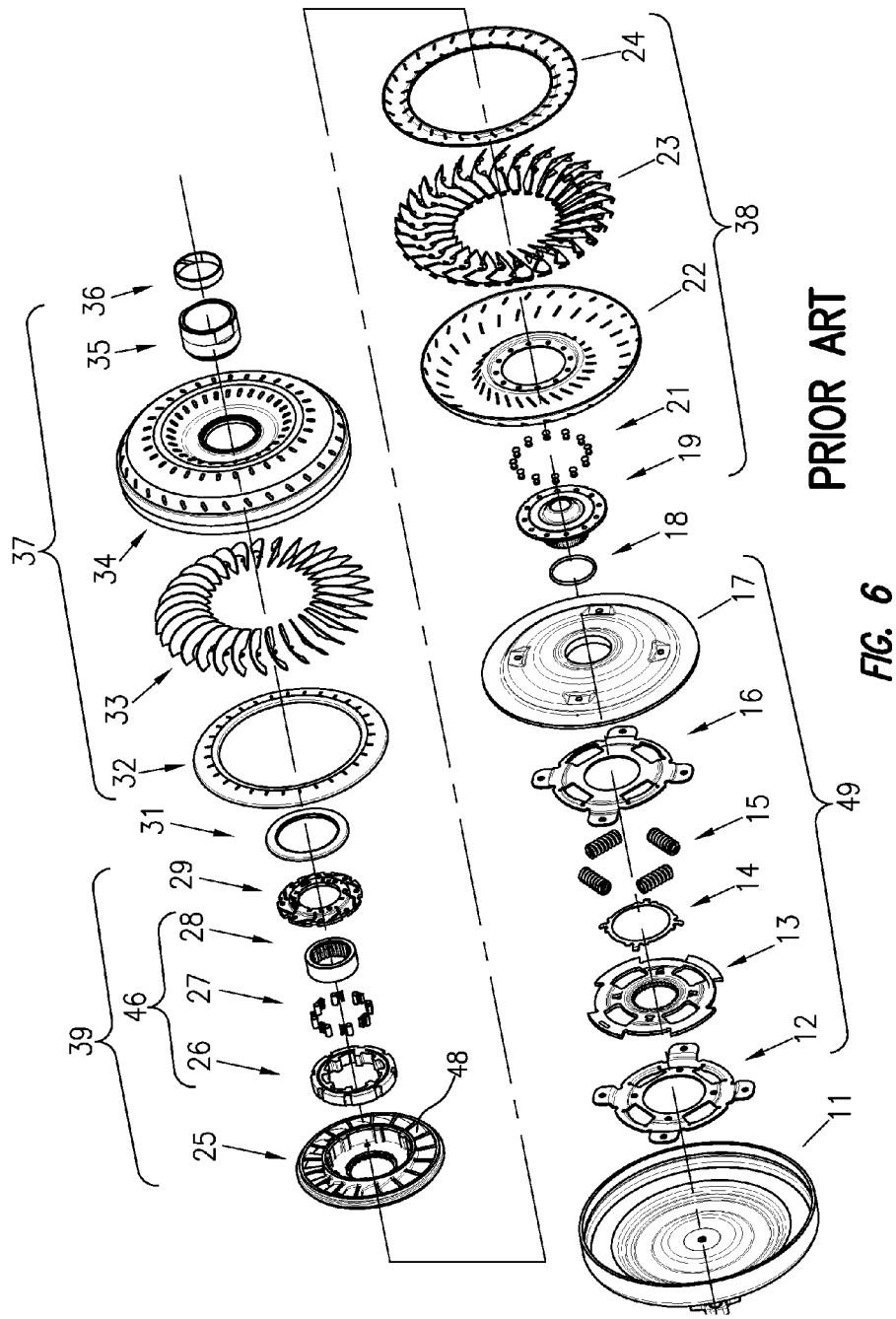
FIG. 6 is a second exploded view of the torque converter shown in FIG. 2, as shown from the perspective of one viewing the exploded torque converter from the right.
Figure 7A:
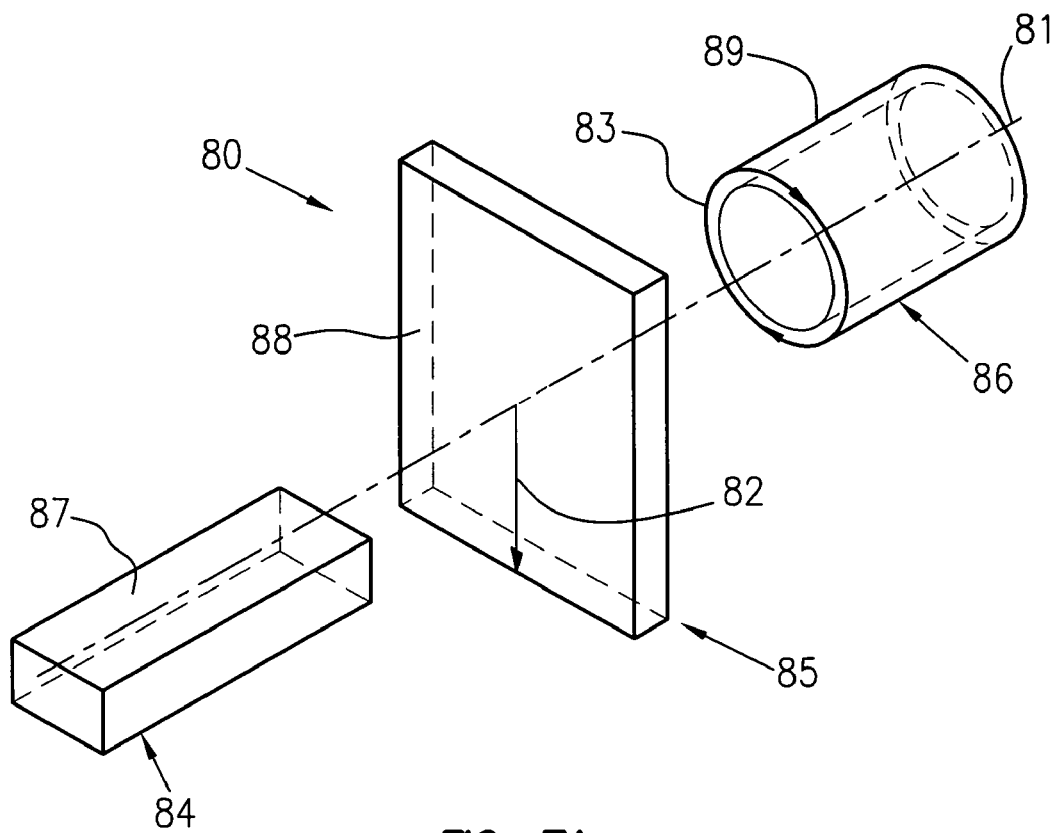
FIG. 7A is a perspective view of a cylindrical coordinate system demonstrating spatial terminology used in the present application.
Figure 7B:
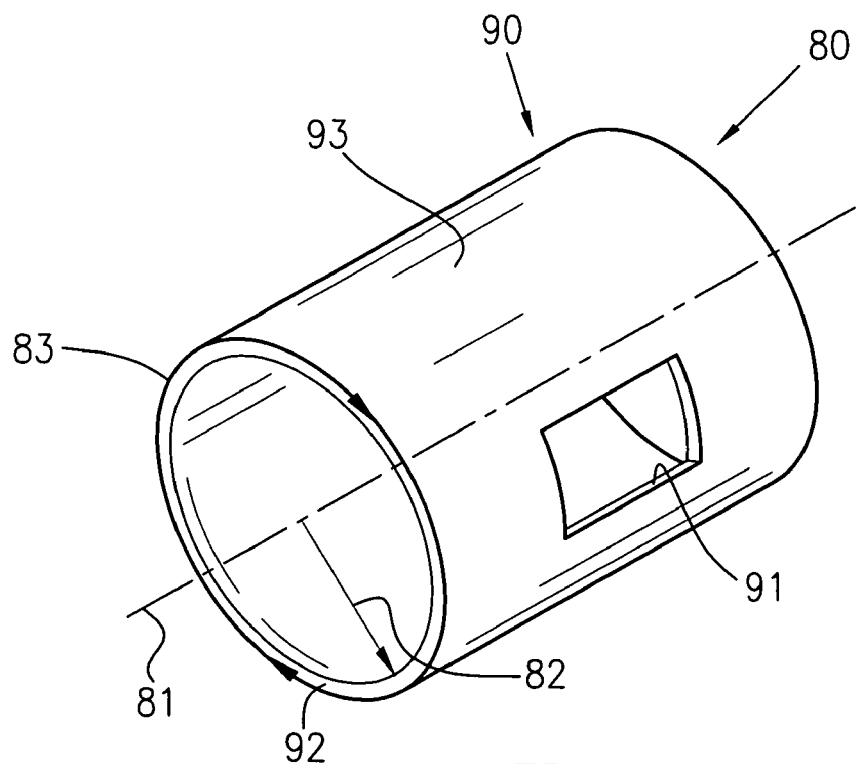
FIG. 7B is a perspective view of an object in the cylindrical coordinate system of FIG. 7A demonstrating spatial terminology used in the present application.
Figure 8:
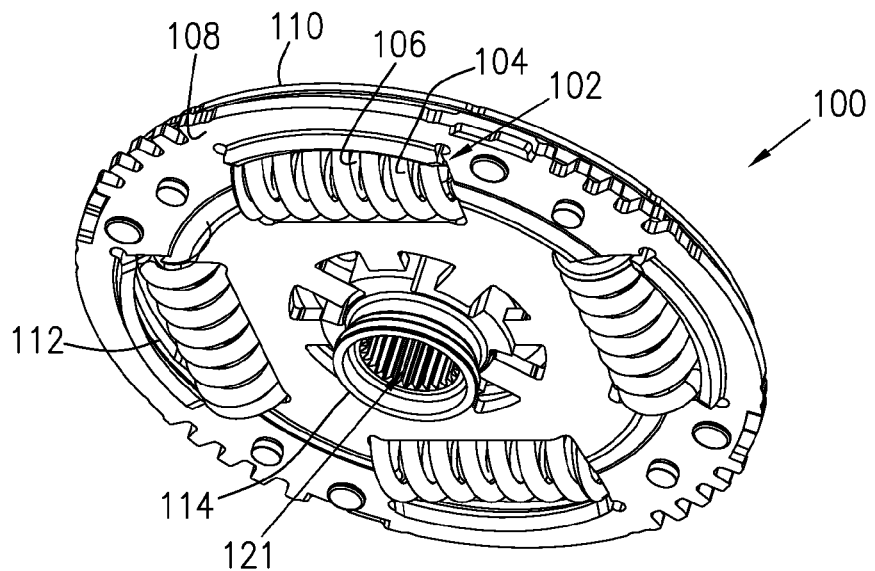
FIG. 8 is a perspective view of a prior art vibration damper.
Figure 9:
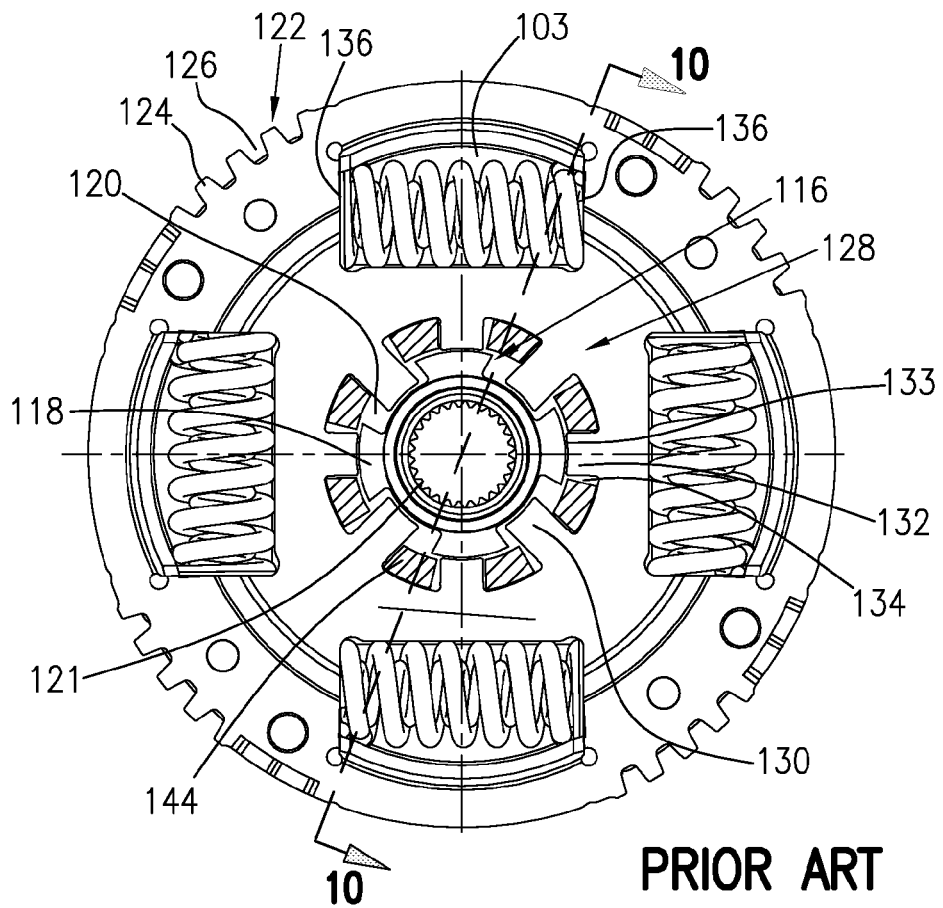
FIG. 9 is a front plan view of the vibration damper of FIG. 8 showing a portion of a turbine hub inserted therein.
Figures 10, 11, 11A:
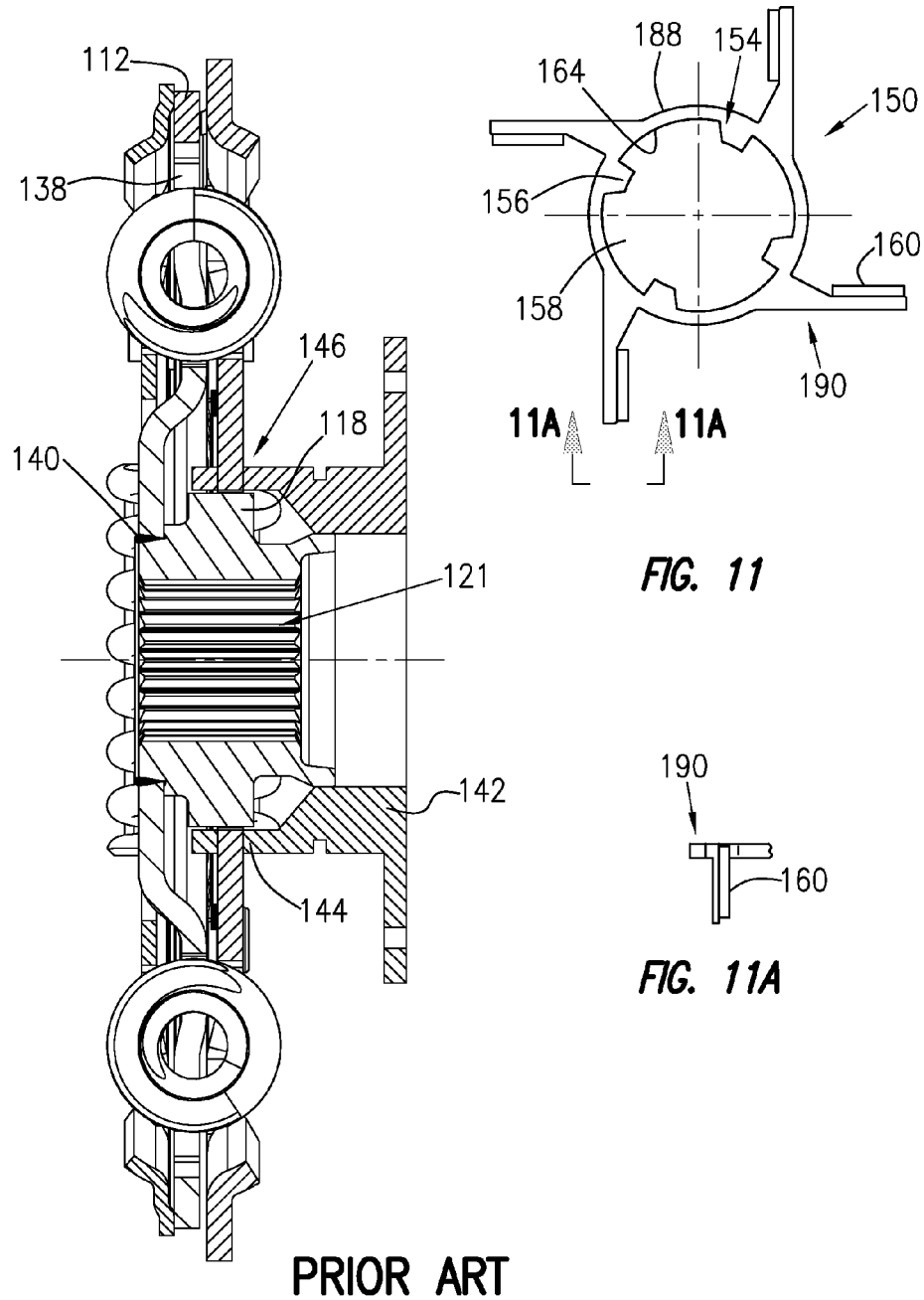
FIG. 10 is a cross-sectional view of the vibration damper of FIG. 8 taken generally along line 10-10 of FIG. 9 showing the turbine hub inserted therein.
FIG. 11 is a front plan view of a present invention lash plate.
FIG. 11A is an end view of the lash plate of FIG. 11 taken generally along line 11A-11A of FIG. 11.
Figure 12:
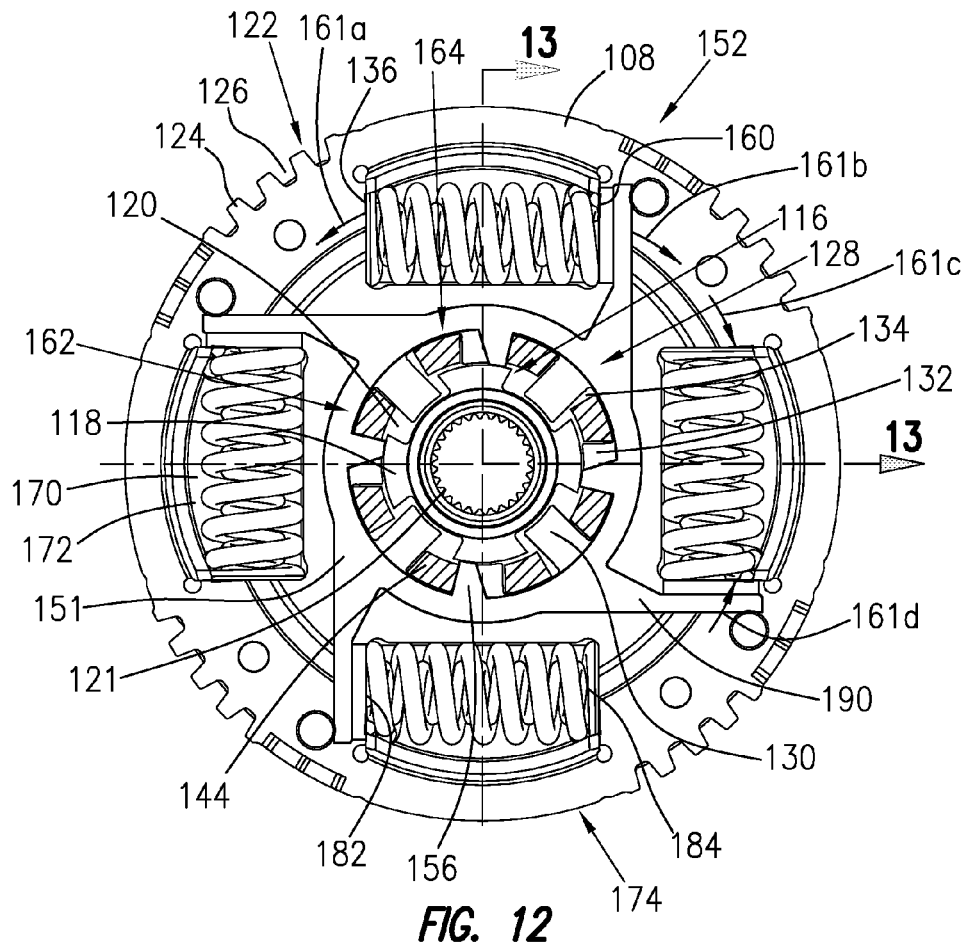
FIG. 12 is a front plan view of the vibration damper of FIG. 9 showing the lash plate of FIG. 11 installed thereon.
Figure 13:
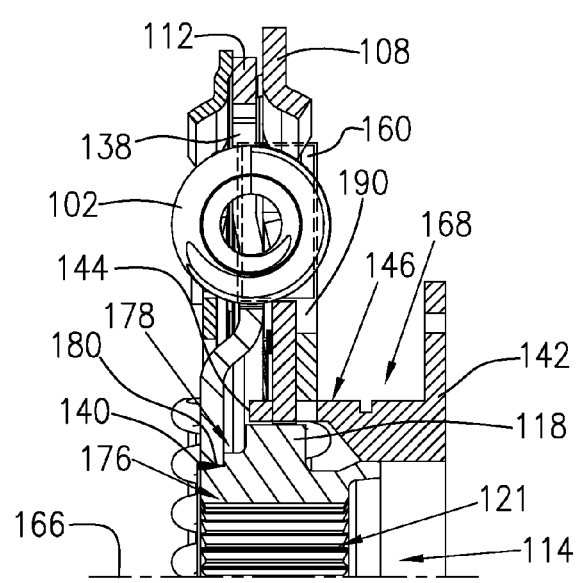
FIG. 13 is a cross-sectional view of present invention vibration damper of FIG. 12 taken generally along line 13-13 of FIG. 12 showing the turbine hub.

Adverting now to the other figures, FIG. 11 shows a front plan view of a present invention lash plate 150, while FIG. 11A shows an end view of lash plate 150 taken generally along line 11A-11A of FIG. 11. FIG. 12 shows a front plan view of vibration damper 152 showing lash plate 150 installed thereon, while FIG. 13 shows a cross-sectional view of present invention vibration damper and lash plate assembly of FIG. 12 taken generally along line 13-13 of FIG. 12 showing a portion of turbine hub 142 disposed therein. The following discussion is best understood in view of FIGS. 8 through 13.

An embodiment of present invention vibration damper 152 comprises a spline, e.g., spline 128, having a plurality of teeth, e.g., long and short teeth 130 and 132, respectively, separated by spaces 134, another spline, e.g., spline 154 having a plurality of teeth, e.g., teeth 156 separated by spaces 158, and a still yet another spline, e.g., spline 146, having a plurality of teeth, e.g., teeth 144. Vibration damper 152 further comprises at least one spring, such as damper springs 102, interconnected between splines 128 and 154. As can be appreciated in view of FIG. 12, springs 102 contact bearing surfaces 136 of cover plate 108 at a first end and bearing surface 160 of lash plate 150 at a second end (discussed in greater detail infra), and as bearing surface 136 is integral with spline 128 via cover plate 108 and bearing surface 160 is integral with spline 154 via lash plate 150, spline 128 is interconnected with spline 154 via springs 102. In this and other embodiments, the plurality of teeth 144 are intermediate the plurality of long and short teeth 130 and 132, respectively, and the plurality of teeth 156, and the at least one spring biases the plurality of long and short teeth 130 and 132, respectively, and the plurality of teeth 156 against the plurality of teeth 144. Thus, the plurality of long and short teeth 130 and 132, respectively, are biased in the direction of arrow 161a, while the plurality of teeth 156 are biased in the direction of arrow 161b. In other words, teeth 144 are inserted between long teeth 130, short teeth 132 and teeth 156, and subsequently teeth 156 are biased against teeth 144 and thereby against teeth 130 and 132. In view of the foregoing, it should be appreciated that in order to initially insert the plurality of teeth 144 between the pluralities of long and short teeth 130 and 132, respectively, and teeth 156, lash plate 150 must be pre-loaded against springs 102, i.e., compressed in the direction of arrows 161c and 161d, thereby exposing the full area within spaces 134 for insertion of spline 146 therein.

Vibration damper 152 further comprises cover plate 108 having inner circumferential surface 162 comprising spline 128, lash plate 150 having inner circumferential surface 164 comprising spline 154 and lash plate 150 is arranged co-planar and proximate cover plate 108. Vibration damper 152 further comprises turbine hub 142 having rotational axis 166 and outer circumferential surface 168 comprising spline 146. Rotational axis 166 is arranged perpendicular to a plane formed by cover plate 108 and lash plate 150. Cover plate 108 further comprises at least one pair of oppositely disposed cover bearing surfaces, e.g., bearing surfaces 136, and at least one spring, e.g., springs 102, disposed between cover bearing surfaces. Cover plate 108 comprises at least one cover window, e.g., window 170, and at least one cover window comprises at least one pair of cover bearing surfaces, e.g., bearing surfaces 136. The lash plate, e.g., lash plate 150, further comprises at least one lash bearing surface, bearing surface 160, and the at least one lash bearing surface is interconnected to one of the cover bearing surfaces by at least one spring, such as spring 102.

Vibration damper 152 includes flange plate 112 having at least one flange window 172 and cover plate 108 comprises at least one cover window 170 in partial alignment with flange window 172. At least one spring is a damper spring, e.g., springs 102, and at least one cover window 170 and at least one flange window 172 are arranged to contain at least one spring 102.

As can be appreciated in view of the foregoing, for the coupling of torque, or in other words power flow, from the turbine (not shown) through turbine hub 142 into cover plate 108 of damper 100, teeth 144 are inserted between long teeth 130 and short teeth 132, i.e., within spaces 134. Unfortunately, the arrangement of teeth 144 within spaces 134 includes lash between teeth 144 and long and short teeth 130 and 132, respectively. For example, during low torque instances, the load on one side of each tooth 144 is low, and thus torque fluctuations between the turbine and turbine hub 142 cause the other side of each tooth 144 to impact or strike the adjacent long or short teeth 130 or 132, respectively, depending upon the direction of rotation of the turbine. The aforementioned impacting causes undesirable rattle within a torque converter. Hence, lash plate 150 is included to prevent teeth 144 from losing contact with long or short teeth 130 or 132, respectively, even during low torque instances. In short, lash plate 150 secures the teeth of spline 146 against the teeth of spline 128.

The present invention vibration damper 152 comprises cover plate 108 comprising at least one cover window 170, inner and outer circumferential surfaces 162 and 174, respectively. The at least one cover window 170 comprises at least one cover bearing surface 136, and inner circumferential surface 162 comprises spline 128. Vibration damper 152 further comprises damper hub 114 comprising inner and outer circumferential surfaces 176 and 178, respectively, where at least a portion of outer circumferential surface 178 comprises spline 116 rotationally connected with spline 128, and inner circumferential surface 176 comprises spline 121. Vibration damper 152 further comprises flange plate 112. Flange plate 112 comprises at least one flange window 172 and inner circumferential surface 180. Inner circumferential surface 180 is fixedly secured to outer circumferential surface 178. The at least one flange window 172 is in partial alignment with at least one cover window 170. Vibration damper 152 further comprises turbine hub 142. Turbine hub 142 comprises outer circumferential surface 168, and outer circumferential surface 168 comprises spline 146. Spline 146 is rotationally connected with spline 128. Additionally, vibration damper 152 comprises at least one damper spring 102 comprising first and second ends 182 and 184, respectively, and disposed within at least one cover window 170 and at least one flange window 172, and lash plate 150 comprising inner and outer circumferential surfaces 164 and 188, respectively, where inner circumferential surface 164 comprises spline 154, and outer circumferential surface 188 comprises at least one engagement arm 190. The at least one engagement arm 190, via bearing surface 160, contacts first end 182 of at least one damper spring 102 and at least one cover bearing surface 136 contacts second end 184 of at least one damper spring 102, wherein at least one damper spring 102 biases splines 128 and 154 against spline 146. It has been found that it is particularly advantageous to include a present invention vibration damper 152 in a torque converter similar to torque converter 10 described above.

Figure 14:
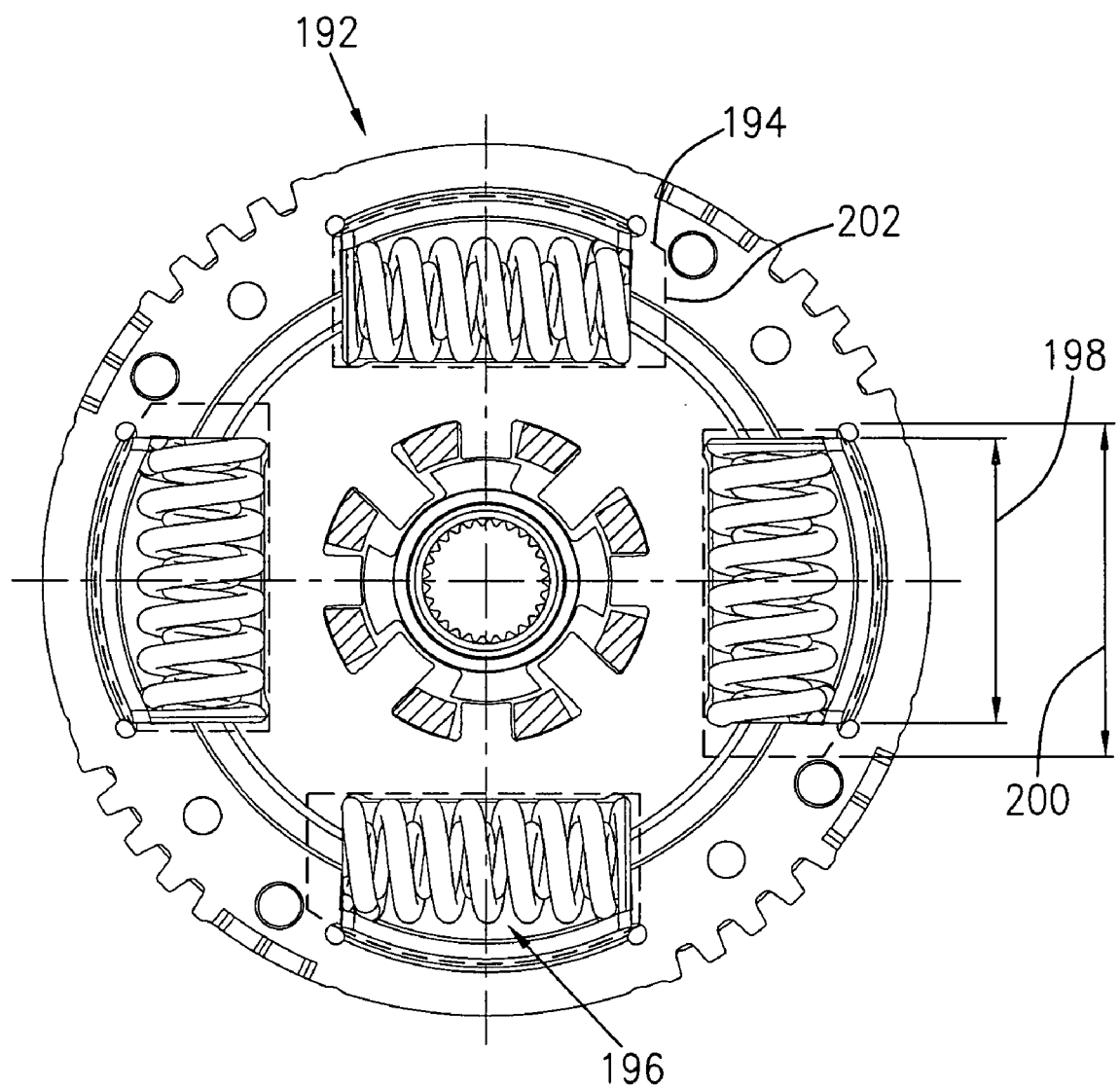
FIG. 14 is a front plan view of the present invention vibration damper of FIG. 12 showing an enlarged flange window in broken lines.

FIG. 14 shows a front plan view of present invention vibration damper 192, similar to vibration damper 152, showing enlarged flange window 194 in broken lines. Vibration damper 192 includes at least one cover window 196 having first length 198 and at least one flange window 194 having second length 200 and second length 200 is greater than first length 198. The foregoing arrangement is particularly advantageous for preventing rattle, or in other words lash, during coast mode. Enlarged flange window 194 provides space for bearing surface 160 during coast to prevent bearing surface 160 from going solid against side 202 of flange window 194. Such contact, i.e., going solid, would cause the loss of preload on lash plate 150 and onto teeth 144 and allow the connection to rattle.

Figure 18:
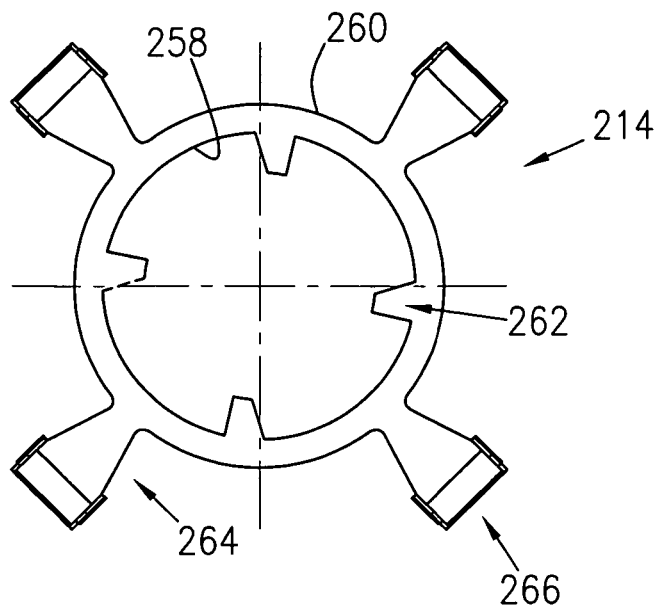
FIG. 18 is a front plan view of the lash plate of FIG. 16 after forming.
Figure 19:
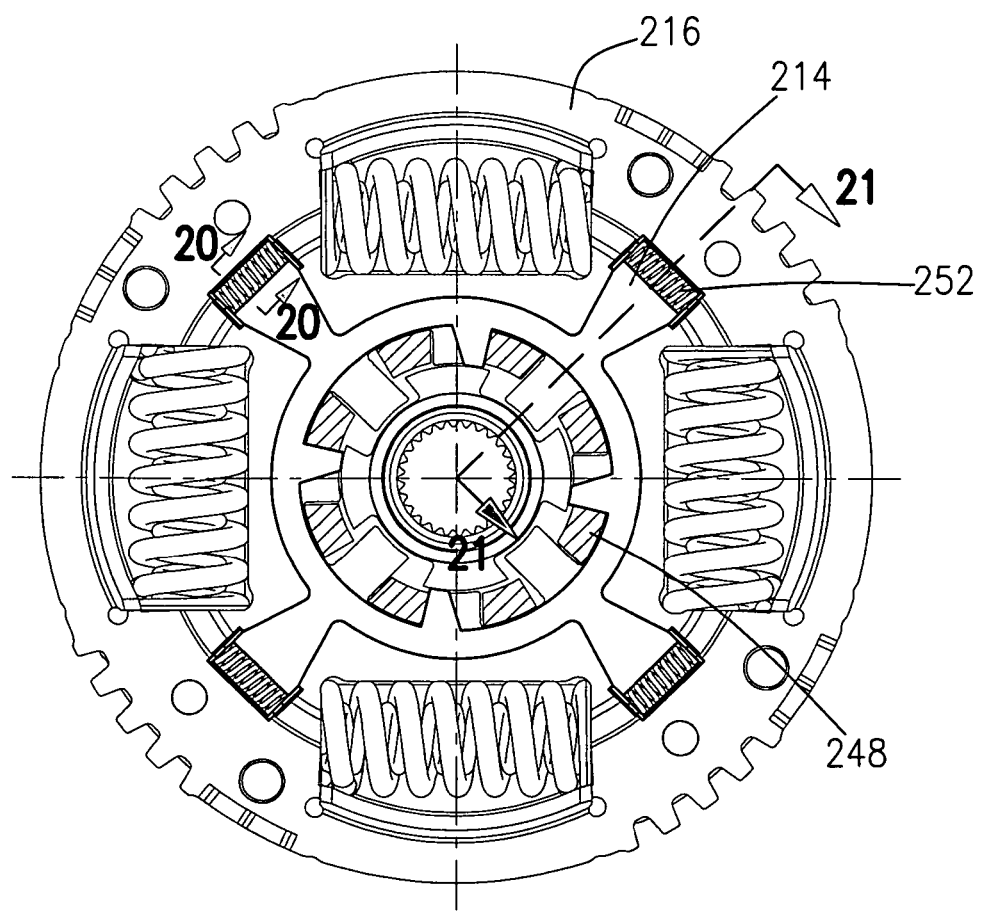
FIG. 19 is a front plan view of the vibration damper of FIG. 15 showing the lash plate of FIG. 18 installed thereon; and, FIG. 20 is a cross-sectional view of the vibration damper of FIG. 19 taken generally along line 20-20 of FIG. 19; and, FIG. 21 is a cross-sectional view of present invention vibration damper of FIG. 19 taken generally along line 21-21 of FIG. 19 showing the turbine hub.
Figure 20:
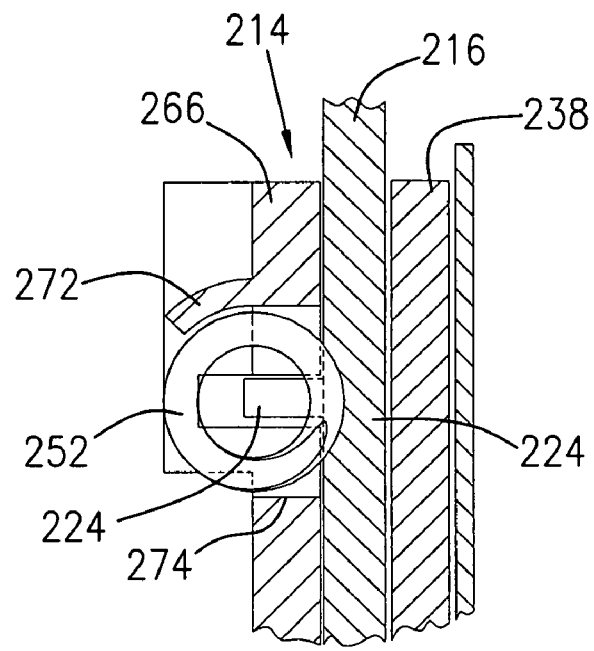
Figure 21:
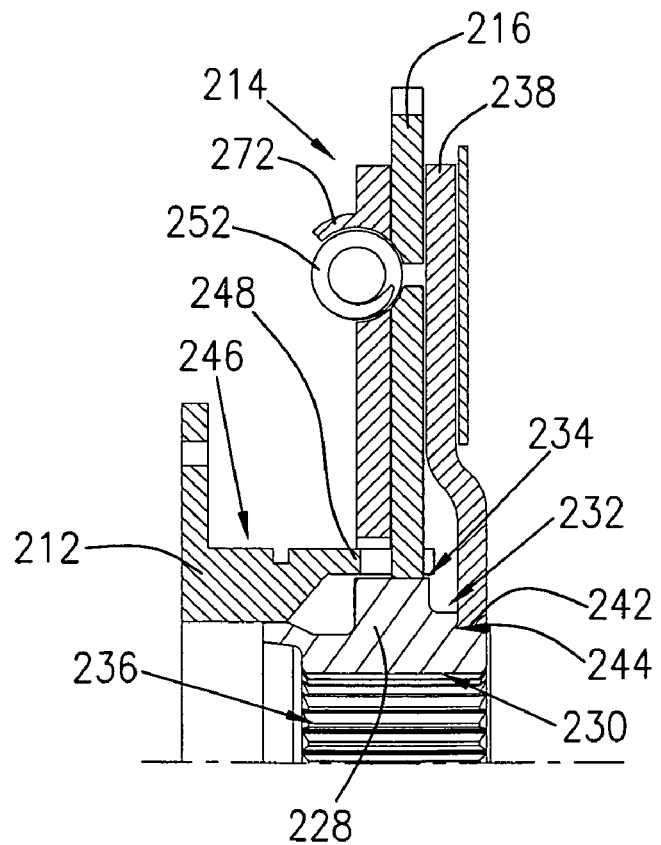

FIG. 15 shows a front plan view of another embodiment of a present invention, vibration damper 210 showing a portion of turbine hub 212 inserted therein. FIG. 16 shows a front plan view of a second embodiment of a present invention lash plate 214 prior to forming, while FIG. 17 shows a perspective view of a portion of lash plate 214 after forming and FIG. 18 shows a front plan view of lash plate 214 after forming. FIG. 19 shows a front plan view of vibration damper 210 showing lash plate 214 installed thereon. FIG. 20 shows a cross-sectional view of vibration damper 210 taken generally along line 20-20 of FIG. 19, while FIG. 21 shows a cross-sectional view of present invention vibration damper 210 taken generally along line 21-21 of FIG. 19 showing turbine hub 212. The following discussion is best understood in view of FIGS. 15 through 19.

Vibration damper 210 comprises cover plate 216 comprising at least one cover window 218, first inner and outer circumferential surfaces 220 and 222, respectively, and at least one pair of oppositely disposed cover bearing flanges 224, and first inner circumferential surface 220 comprises first spline 226. Vibration damper 210 further comprises damper hub 228 comprising second inner and outer circumferential surfaces 230 and 232, respectively, at least a portion of second outer circumferential surface 232 comprises second spline 234 rotationally connected with first spline 226, second inner circumferential surface 230 comprises third spline 236 arranged to be rotationally connected to an output shaft (not shown). Vibration damper 210 also comprises flange plate 238 comprising at least one flange window 240 and third inner circumferential surface 242, third inner circumferential surface 242 fixedly secured to second outer circumferential surface 232 via weld 244, at least one flange window 240 in partial alignment with at least one cover window 218, and also comprises turbine hub 212 comprising third outer circumferential surface 246, third outer circumferential surface 246 comprising fourth spline 248, fourth spline 248 rotationally connected with first spline 226. Vibration damper 210 yet further comprises at least one damper spring 250 disposed within at least one cover window 218 and at least one flange window 240, and at least one cover spring 252 comprising first and second ends 254 and 256, respectively, and disposed between at least one pair of cover bearing flanges 224. Additionally, vibration damper 210 comprises lash plate 214 comprising fourth inner and outer circumferential surfaces 258 and 260, respectively, fourth inner circumferential surface 258 comprises fifth spline 262, fourth outer circumferential surface 260 comprises at least one engagement arm 264, at least one engagement arm 264 contacting first end 254 of at least one cover spring 252 and one of at least one pair of cover bearing flanges 224 contacting second end 256 of at least one cover spring 252, wherein at least one cover spring 252 biases first and fifth splines 226 and 262, respectively, against fourth spline 248. It has been found that it is particular advantageous to include a present invention vibration damper 210 in a torque converter similar to torque converter 10 described above.

In this embodiment, cover plate 216 includes cover bearing flanges 224 which are formed by stamping and bending a portion of cover plate 216 outward. Lash plate 214 includes outer portions 266 which include bearing surfaces 268 arranged to contact cover springs 252, and also includes slots 270 arranged to permit bearing flanges 224 to pass therethrough during instances of torque loading. Additionally, outer portions 266 include flange 272 and surface 274 arranged to contain cover springs 252 as lash plate 214 is disposed proximate cover plate 216.

As can be appreciated in view of the foregoing, for the coupling of torque, or in other words power flow, from the turbine (not shown) through turbine hub 212 into cover plate 216 of damper 210, the teeth of spline 248 are inserted between the teeth of spline 226. Unfortunately, the arrangement of the teeth of spline 248 within the spaces between the teeth of spline 226 includes lash. For example, during low torque instances, the load on one side of each tooth of spline 248 is low, and thus torque fluctuations between the turbine and turbine hub 212 cause the other side of each tooth of spline 248 to impact or strike the adjacent teeth of spine 226. The aforementioned impacting causes undesirable rattle within a torque converter. Hence, lash plate 214 is included to prevent the teeth of spline 248 from losing contact with the teeth of spline 226, even during low torque instances. In short, lash plate 214 secures the teeth of spline 248 against the teeth of spline 226.

Although in the embodiments shown in the figures lash plates 150 and 214 are shown disposed on top of cover plates 108 and 216, it should be appreciated that lash plates 150 and 214 may also be disposed under cover plates 108 and 216, and such variations are within the spirit and scope of the claimed invention. It should also be appreciated that lash plates 150 and 214 may be manufactured from rigid and/or flexible materials. It should similarly be appreciated that although the above described arrangement is used in combination with a torque converter, the same arrangement may also be used with a manual clutch.

It must also be appreciate that the present invention further comprises a method for preventing lash within a vibration damper. The method of preventing lash in a vibration damper applies to the above described dampers, i.e., a vibration damper comprising a first spline having a plurality of first teeth, a second spline having a plurality of second teeth, a third spline having a plurality of third teeth and at least one spring interconnected between the first and second splines. The method comprises the steps of: introducing the plurality of third teeth intermediate the plurality of first teeth and the plurality of second teeth; and, biasing the plurality of first teeth and the plurality of teeth against the plurality of third teeth with the at least one spring. Also as described above, in some embodiments, the vibration damper further comprises a first cover plate having a first inner circumferential surface comprising the first spline, a lash plate having a second inner circumferential surface comprising the second spline, the lash plate arranged co-planar and proximate the first cover plate and a turbine hub having a rotational axis and a first outer circumferential surface comprising the third spline, the rotational axis arranged perpendicular to a plane formed by the first cover plate and the lash plate.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A vibration damper comprising:
    a first spline having a plurality of first teeth;
    a second spline having a plurality of second teeth;
    a third spline having a plurality of third teeth;
    a lash plate having a second inner circumferential surface comprising said second spline; and,
    at least one spring interconnected between said first and second splines, wherein said plurality of third teeth are intermediate said plurality of first teeth and said plurality of second teeth, and said at least one spring biases said plurality of first teeth and said plurality of second teeth against said plurality of third teeth.

2. The vibration damper of claim 1 further comprising:
    a cover plate having a first inner circumferential surface comprising said first spline;
    said lash plate arranged co-planar and proximate said cover plate; and,
    a turbine hub having a rotational axis and a first outer circumferential surface comprising said third spline, said rotational axis arranged perpendicular to a plane formed by said cover plate and said lash plate.

3. The vibration damper of claim 2 wherein said cover plate further comprises at least one pair of oppositely disposed cover bearing surfaces and said at least one spring is disposed between said at least one pair of cover bearing surfaces.

4. The vibration damper of claim 3 wherein said cover plate comprises at least one cover window and said at least one cover window comprises said at least one pair of cover bearing surfaces.

5. The vibration damper of claim 3 wherein said lash plate further comprises at least one lash bearing surface and said at least one lash bearing surface is interconnected to one of said cover bearing surfaces by said at least one spring.

6. The vibration damper of claim 3 further comprising a flange plate having at least one flange window and said cover plate comprises at least one cover window in partial alignment with said flange window.

7. The vibration damper of claim 6 wherein said at least one spring is a damper spring and said at least one cover window and said at least one flange window are arranged to contain said at least one spring.

8. The vibration damper of claim 6 wherein said at least one spring is a cover spring and said at least one cover window and said at least one flange window are arranged to contain at least one damper spring.

9. The vibration damper of claim 6 wherein said at least one cover window has a first length and said at least one flange window has a second length greater than said first length.

10. A torque converter comprising the vibration damper of claim 1.

11. A vibration damper comprising:
    a cover plate comprising at least one cover window, first inner and outer circumferential surfaces, said at least one cover window comprises at least one cover bearing surface, and said first inner circumferential surface comprises a first spline;
    a damper hub comprising second inner and outer circumferential surfaces, at least a portion of said second outer circumferential surface comprises a second spline rotationally connected with said first spline, said second inner circumferential surface comprises a third spline;
    a flange plate comprising at least one flange window and a third inner circumferential surface, said third inner circumferential surface fixedly secured to said second outer circumferential surface, said at least one flange window in partial alignment with said at least one cover window;
    a turbine hub comprising a third outer circumferential surface, said third outer circumferential surface comprising a fourth spline, said fourth spline rotationally connected with said first spline;
    at least one damper spring comprising first and second ends and disposed within said at least one cover window and said at least one flange window; and,
    a lash plate comprising fourth inner and outer circumferential surfaces, said fourth inner circumferential surface comprises a fifth spline, said fourth outer circumferential surface comprises at least one engagement arm, said at least one engagement arm contacting said first end of said at least one damper spring and said at least one cover bearing surface contacting said second end of said at least one damper spring, wherein said at least one damper spring biases said first and fifth splines against said fourth spline.

12. A torque converter comprising the vibration damper of claim 11.

13. A method of preventing lash in a vibration damper, said vibration damper comprising a first spline having a plurality of first teeth, a second spline having a plurality of second teeth, a third spline having a plurality of third teeth, a lash plate having a second inner circumferential surface comprising said second spline and at least one spring interconnected between said first and second splines, said method comprising the steps of:
    introducing said plurality of third teeth intermediate said plurality of first teeth and said plurality of second teeth; and,
    biasing said plurality of first teeth and said plurality of second teeth against said plurality of third teeth with said at least one spring.

14. The method of claim 13 wherein said vibration damper further comprises a first cover plate having a first inner circumferential surface comprising said first spline, said lash plate arranged co-planar and proximate said first cover plate and a turbine hub having a rotational axis and a first outer circumferential surface comprising said third spline, said rotational axis arranged perpendicular to a plane formed by said first cover plate and said lash plate.

* * * * *